US012603354B2

(12) United States Patent
Lu et al.

(10) Patent No.: US 12,603,354 B2
(45) Date of Patent: Apr. 14, 2026

(54) PORTABLE ENERGY-STORAGE POWER SUPPLY DEVICE

(71) Applicant: CHONGQING DINKING POWER MACHINERY CO., LTD, Chongqing (CN)

(72) Inventors: Jinbo Lu, Chongqing (CN); Xiang Liu, Chongqing (CN); Yuansong Wu, Chongqing (CN); Shiqian Xie, Chongqing (CN); Hai Xu, Chongqing (CN)

(73) Assignee: CHONGQING DINKING POWER MACHINERY CO., LTD, Chongqing (CN)

( * ) Notice: Subject to any disclaimer, the term of this patent is extended or adjusted under 35 U.S.C. 154(b) by 541 days.

(21) Appl. No.: 18/127,009

(22) Filed: Mar. 28, 2023

(65) Prior Publication Data

US 2024/0297369 A1 Sep. 5, 2024

(30) Foreign Application Priority Data

Mar. 3, 2023 (CN) .......................... 202310206296.1

(51) Int. Cl.
| | |
|---|---|
| *H01M 10/6568* | (2014.01) |
| *H01M 10/46* | (2006.01) |
| *H01M 10/48* | (2006.01) |
| *H01M 10/613* | (2014.01) |
| *H01M 10/623* | (2014.01) |
| *H01M 10/6563* | (2014.01) |
| *H01M 50/24* | (2021.01) |
| *H01M 50/247* | (2021.01) |
| *H01M 50/262* | (2021.01) |
| *H02J 7/70* | (2026.01) |
| *H02J 50/00* | (2016.01) |

(52) U.S. Cl.
CPC ....... *H01M 10/6568* (2015.04); *H01M 10/46* (2013.01); *H01M 10/488* (2013.01); *H01M 10/613* (2015.04); *H01M 10/623* (2015.04); *H01M 10/6563* (2015.04); *H01M 50/24* (2021.01); *H01M 50/247* (2021.01); *H01M 50/262* (2021.01); *H02J 7/70* (2026.01); *H02J 50/005* (2020.01); *H01M 2220/30* (2013.01)

(58) Field of Classification Search
USPC ....................................................... D13/110
See application file for complete search history.

(56) References Cited

FOREIGN PATENT DOCUMENTS

| | | | | | |
|---|---|---|---|---|---|
| CN | 109362191 A | * | 2/2019 | ............... | H05K 5/13 |
| CN | 112737052 A | * | 4/2021 | ............... | H05K 5/10 |

OTHER PUBLICATIONS

Machine Translation of CN-109362191-A (Year: 2019).*
Machine translation of CN-112737052-A (Year: 2021).*

* cited by examiner

*Primary Examiner* — Gregg Cantelmo

(57) ABSTRACT

A portable energy-storage power supply device comprises a shell, a control module, a battery module and an inverter module. The inverter module is installed on a right shell through bolts. A slot for installing a wireless charging cover is formed after a left shell and the right shell are assembled together. A charging coil holder for fixing a wireless charging coil is disposed on an inner side of the wireless charging cover. The portable energy-storage power supply device has the advantages that installation is convenient, operation is easy, the layout of internal parts is reasonable, and the width of the shell is small.

8 Claims, 5 Drawing Sheets

17

17

17

PORTABLE ENERGY-STORAGE POWER SUPPLY DEVICE

BACKGROUND OF THE INVENTION

1. Technical Field

The invention belongs to the technical field of energy-storage power supplies, and particularly relates to a portable energy-storage power supply device.

2. Description of Related Art

Energy-storage power supplies have broad application in emergency communication, power line repair, medical equipment, exploration surveying and mapping, military, fire-fighting and disaster relief, and outdoor environmental detection, as well as in regions deficient in power. With the development of society and the wide application of energy-storage power supplies, people in modern society enjoy increasingly richer leisure-time activities such as self-driving tours, traveling with friends and camping, which raises a demand for energy-storage power supplies in peoples' life.

However, due to the fact that the shell of existing energy-storage power supplies is generally of a square structure formed by an upper part and a lower part, the depth is large, internal parts are convenient to install, and the installation space is wasted, which in turn leads to a large space occupied by the energy-storage power supplies and a high transfer cost.

BRIEF SUMMARY OF THE INVENTION

The objective of the invention is to provide a portable energy-storage power supply device, which is convenient to carry, with internal parts easy to mount, and solves the problems of the large depth, inconvenient installation of internal parts and waste of installation space of existing energy-storage power supplies with a shell of a square structure formed by an upper part and a lower part.

To fulfill the above objective, the invention adopts the following technical solution: a portable energy-storage power supply device comprises a shell, as well as a control module, a battery module and an inverter module which are located in the shell and are installed from front to back, the shell comprises a left shell, a right shell, a front control panel mount and a rear inverter ventilator which are assembled together, a panel display screen of the control module is installed on the front control panel mount, a shell of the battery module is formed by a front part and a right part which are assembled together, circular mounting holes are formed in four corners of the shell of the battery module, the battery module is installed between the left shell and the right shell through connecting rods penetrating through the mounting holes, the inverter module is installed between the left shell and the right shell through bolts, a positioning groove matching the outer contour of the middle of the inverter module is disposed on an inner side of the middle of the rear inverter ventilator and is used for realizing quick clamping of the inverter module, a horizontal handle is formed at a top of the shell, U-shaped elastic hoop support legs are symmetrically disposed at front and rear ends of a bottom of the shell, ribs are disposed at a bottom of each U-shaped elastic hoop support legs, and two ends of each U-shaped elastic hoop support leg are bent inwards to be buckled and connected to steps disposed on an outer wall of the shell.

Preferably, a cooling fan is installed on a back side of the control module, and a water shield for guiding water from the outside to two sides is disposed right above the cooling fan; a cooling fan is disposed at a top of the inverter module, and a water baffle inclining backwards is erected right above the cooling fan to guide the water from the outside backwards, such that water seeping into the shell via seams in the shell can be effectively prevented from flowing into the cooling fan, and internal parts will not be damaged and will not be interfered with by guiding water to the edges of the cavity of the shell; and an air outlet is formed in a bottom of the inverter module and corresponds to an air inlet of the cooling fan at the top, such that elements in an inverter can be effectively cooled, and the performance of the elements will not be affected by high temperature.

Further preferably, the rear inverter ventilator is a grid structure, a top grid opening is used as an air supply port of the cooling fan at the top of the inverter module, and a bottom grid opening is used as an air discharge port in the bottom of the inverter module. The design is reasonable, and a ventilation passage is provided for air to flow in and out of the inverter.

Further preferably, a cooling fan is disposed on a right side of the battery module, an opening matching the cooling fan in size is reserved in the right shell, and the cooling fan at this position is only used for cooling the battery module which will generate the maximum amount of heat, so the design is reasonable; an air outlet is formed in the left shell corresponding to a left side of the battery module, waterproof covers which are installed through buckles are disposed on an outer side of the left shell and an outer side of the right side, and strip-shaped air vents are formed in the waterproof covers, such that water is prevented from entering the shell under the premise that ventilation is guaranteed, the design is reasonable, and the water covers can be easily and quickly installed and detached through the buckles.

Further preferably, the connecting rods are external hexagonal prisms, locking screws screwed-in from the shell are disposed at two ends of each connecting rod, the hexagonal prisms can realize primary positioning, and the battery module and the right shell can be primarily positioned when the first hexagonal prism penetrates through a mounting bracket, so the design is ingenious, and the installation stability can be improved under the condition that primary positioning is realized; anti-rotation gaskets are disposed at two ends of each mounting hole, internal hexagonal holes matching the connecting rods in size are formed in a center of the anti-rotation gaskets, annular petal-like protrusions are disposed at inner ends of the anti-rotation gaskets and stretch into the mounting holes, outer ends of the anti-rotation gaskets are shaped like a circular plate and abut against ends of the mounting holes, such that the battery module can be more stably installed on the left shell and the right shell and can be detached without being affected, the structure is ingenious, and the layout is reasonable; and each of anti-rotation protrusions on inner walls of the mounting holes is exactly clamped between any two of the petal-like protrusions at the inner ends of the anti-rotation gaskets, such that anti-rotation and quick positioning and installation are realized.

Further preferably, a slot for installing a wireless charging cover is formed after the left shell and the right shell are assembled together, and a charging coil holder for fixing a wireless charging coil is disposed on an inner side of the wireless charging coil cover, so the wireless charging site is obvious, and is formed by the left shell and the right shell, thus occupying a small space, and the layout is ingenious.

Further preferably, the U-shaped elastic hoop support legs are made of rubber, thus being low in cost and elastic, and material selection is reasonable.

Further preferably, a windshield cotton strip which extends vertically downwards to the bottom of the shell is disposed at an end of the positioning groove, and a horizontal windshield cotton strip is inwardly disposed below the air outlet of the inverter module to guide an air direction of the air outlet of the inverter module; a windshield area is formed between the lower half and the battery module by the windshield cotton strips, such that the situation where air flowing out of the inverter module enters the shell rather than being guided out of the shell is effectively avoided, an air inlet passage is formed in the upper portion of the rear inverter ventilator, and an air outlet passage is formed in the lower portion of the rear inverter ventilator.

The invention has the following beneficial effects:

(1) Compared with the shell structure with a large depth of existing common portable energy-storage power supplies, the shell of the portable energy-storage power supply device is formed by a left shell and a right shell which are assembled together, so installation is convenient, the depth is small, and parts can be installed and detached easily; the shell of the battery module is composed of a left part and a right part which are assembled together, circular mounting holes are formed in four corners of the shell of the battery module, and the battery module is installed between the left shell and the right shell through connecting rods penetrating through the mounting holes, such that the installation stability is good; the inverter module is installed between the left shell and the right shell through bolts, and the shell can be placed horizontally before internal parts are installed, such that parts can be installed easily, and operation is more convenient and easier.

(2) The control module, the battery module and the inverter module are installed in the shell from front to back, so the layout of internal parts is reasonable; the panel display screen of the control module is installed on the front control panel mount, such that functions of the energy-storage power supply device can be operated on the front side of the shell; the panel of the control module occupies a small space and is disposed on the front side, and the battery module which occupies a small area is disposed in the middle, such that the left-right width of the shell is minimized.

(3) A positioning groove matching the outer contour of the middle of the inverter module is disposed on the inner side of the middle of the rear inverter ventilator, such that the inverter module can be clamped quickly and can be installed easily; a horizontal handle is formed in the top of the shell, such that users can carry the power supply devices conveniently, and the handle occupies little space; no extra part is needed, such that the installation cost is effectively reduced.

(4) The U-shaped elastic hoop support legs are symmetrically disposed at front and rear ends of the bottom of the shell, ribs are disposed at the bottom of the U-shaped elastic hoop support legs, and the two ends of the U-shaped elastic hoop support legs are bent inwards to be buckled and connected to steps disposed on the outer wall of the shell, such that the U-shaped elastic hoop support legs can be installed at the bottom of the shell quickly and are easily to install and detach, and abrasion of the shell caused by direct contact between the shell and the ground is effectively avoided, and the service life of the portable energy-storage power supply device is prolonged; and the elastic U-shaped elastic hoop support legs have a shock absorption effect, so the situation where internal parts fall due to vibrations when the portable energy-storage power supply device is placed on the ground is avoided.

To sum up, the portable energy-storage power supply device has the advantages that installation is convenient, operation is easy, the layout of internal parts is reasonable, and the width of the shell is small.

DETAILED DESCRIPTION OF THE INVENTION

The invention will be further described below in conjunction with embodiments and drawings.

Figure 1:
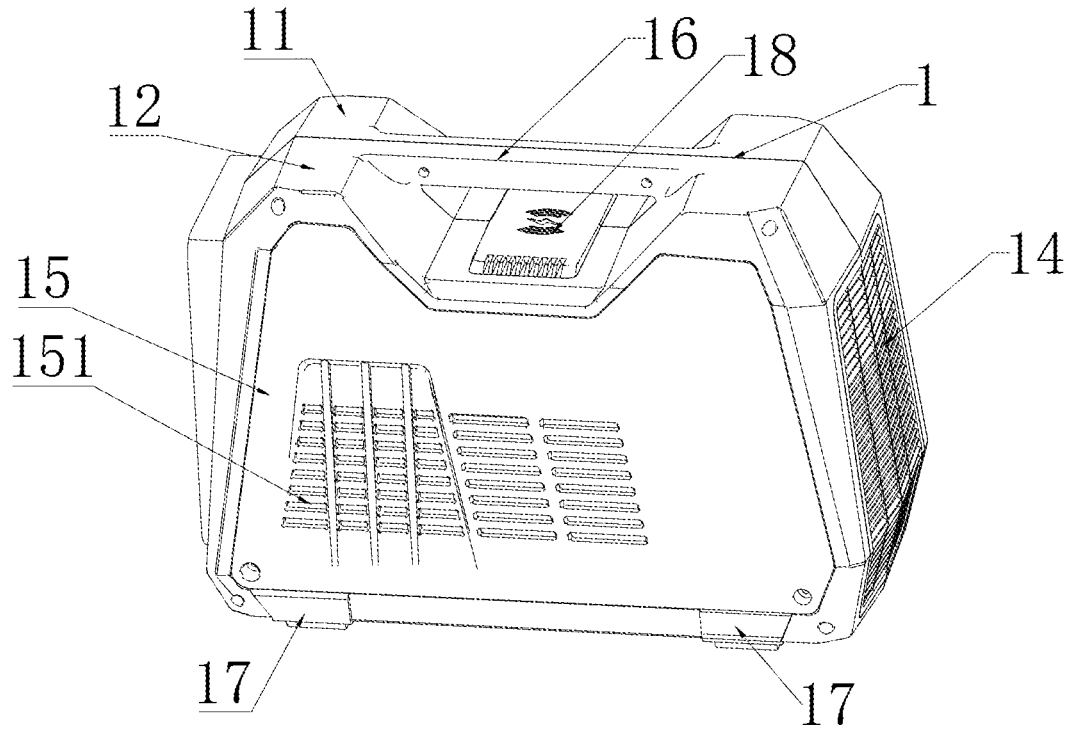
FIG. 1 is a structural view of the invention.
Figure 2:
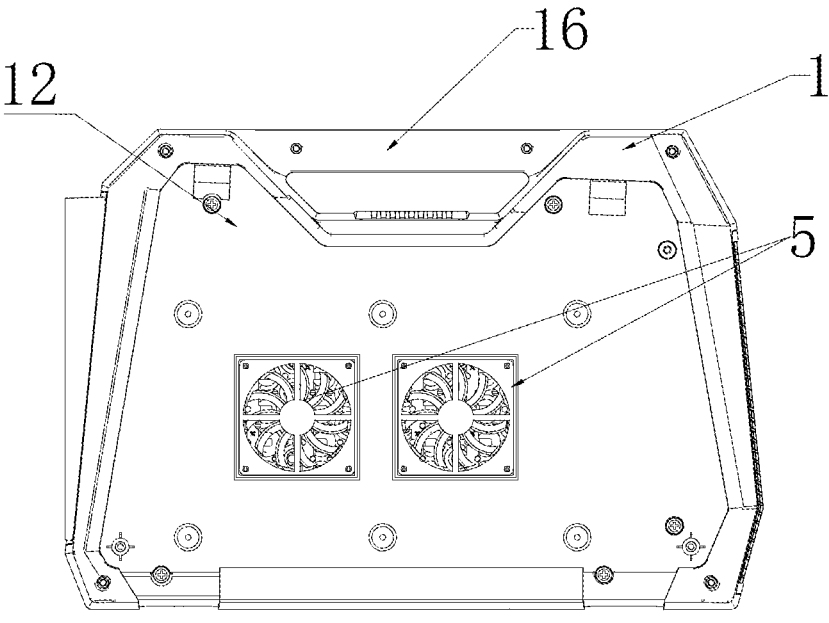
FIG. 2 is a front view of FIG. 1.
Figure 3:
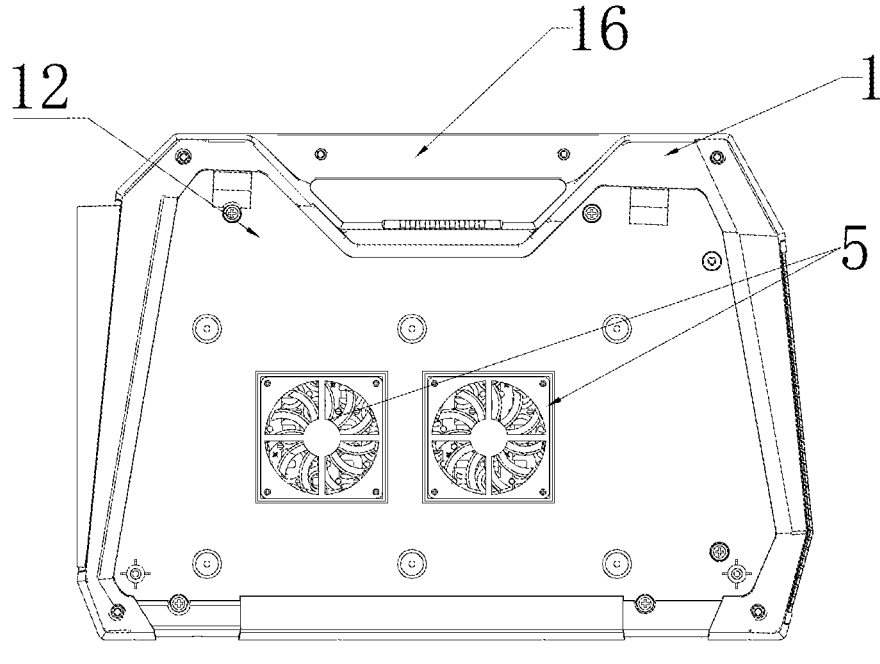
FIG. 3 is an internal structural view of FIG. 2 after waterproof covers are opened.
Figure 4:
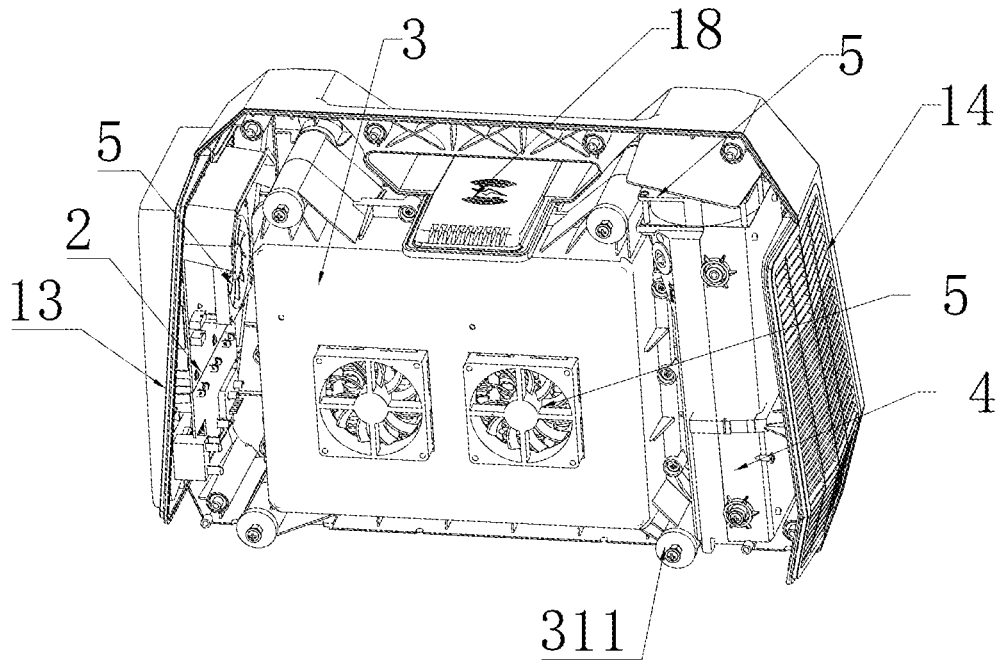
FIG. 4 is an internal structural view of FIG. 3 after a right shell is opened.
Figure 5:
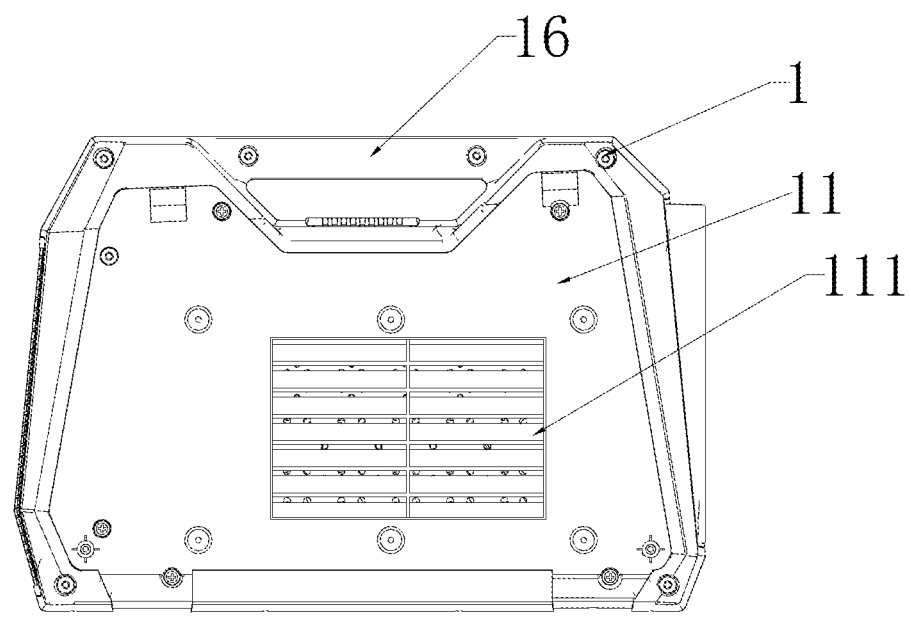
FIG. 5 is a rear view of FIG. 1.
Figure 6:
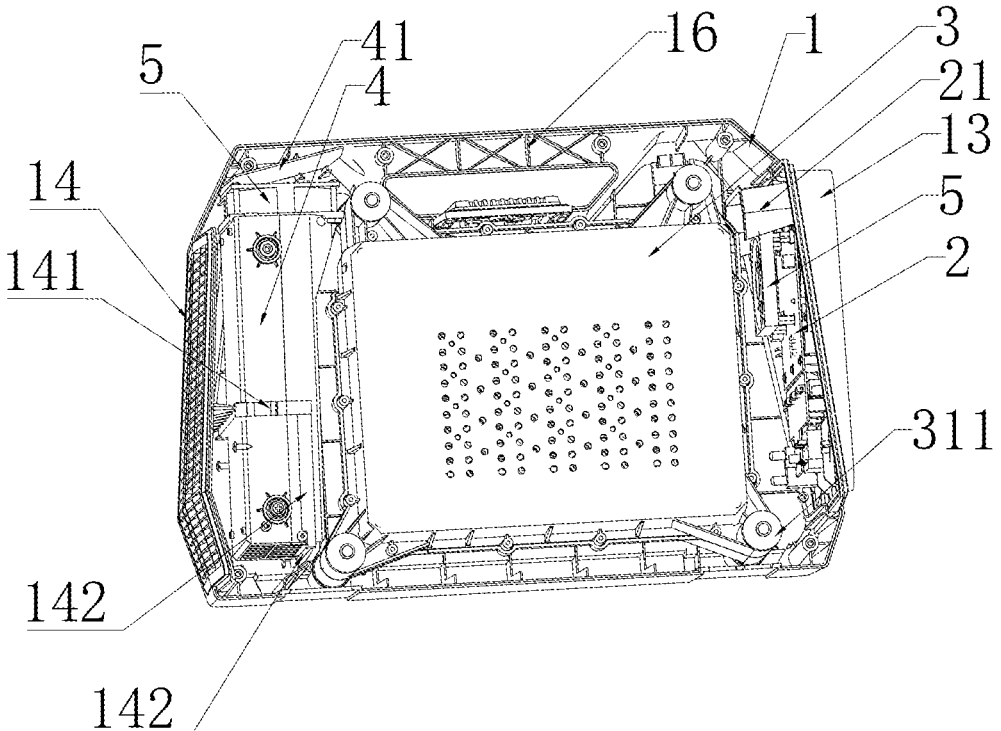
FIG. 6 is an internal structural view of FIG. 5 after a left shell is opened.
Figure 7:
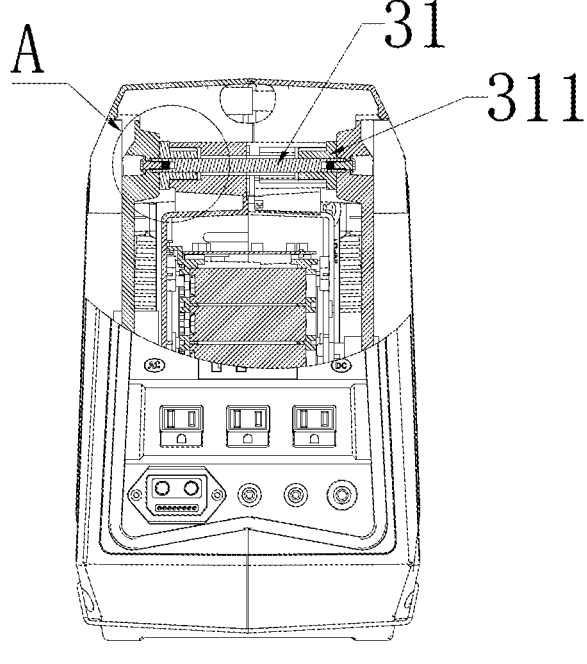
FIG. 7 is a left view of FIG. 1.
Figure 8:
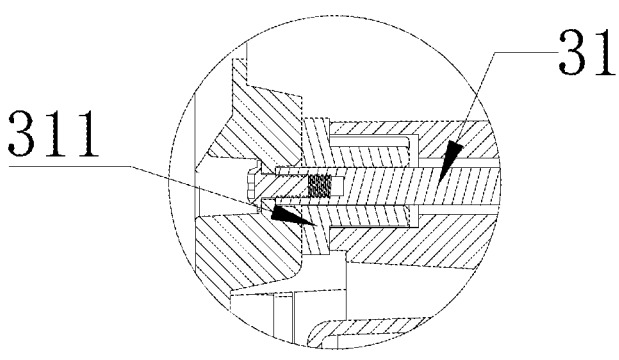
FIG. 8 is an enlarged view of part A in FIG. 8.
Figure 9:
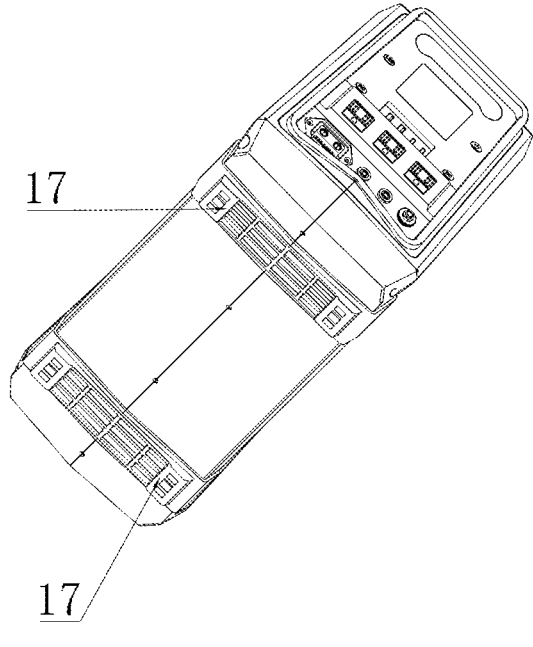
FIG. 9 is a structural view of a portable energy-storage power supply device from another perspective.
Figure 10:
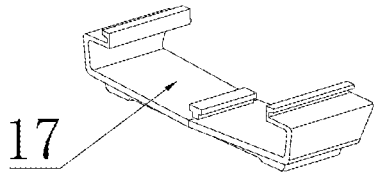
FIG. 10 is a structural diagram of a U-shaped elastic loop support leg.

As shown in FIG. 1-FIG. 10, a portable energy-storage power supply device is composed of a shell 1, as well as a control module 2, a battery module 3 and an inverter module 4 which are located in the shell 1 and are installed from front to back.

The shell 1 is composed of a left shell 11, a right shell 12, a front control panel mount 13 and a rear inverter ventilator 14 which are assembled together.

The rear inverter ventilator 14 is preferably a grid structure, a top grid opening is used as an air supply port of a cooling fan at the top of the inverter module 4, and a bottom grid opening is used as an air discharge port in the bottom of the inverter module 4.

A positioning groove 141 matching the outer contour of the middle of the inverter module 4 is disposed on an inner side of the middle of the rear inverter ventilator 14.

The positioning groove 141 is used for realizing quick clamping of the inverter module 4.

A windshield cotton strip 142 which extends vertically downwards to the bottom of the shell 1 is disposed at the end of the positioning groove 141, and a horizontal windshield cotton strip 142 is inwardly disposed below an air outlet of the inverter module 4 to guide the air direction of the air outlet of the inverter module 4.

Waterproof covers 15 which are installed through buckles are disposed on an outer side of the left shell 11 and an outer side of the right shell 12 respectively, and strip-shaped air vents 151 are formed in the waterproof covers 15.

A horizontal handle 16 is formed at the top of the shell 1.

U-shaped elastic hoop support legs 17 are symmetrically disposed at front and rear ends of the bottom of the shell, and are made of rubber.

Ribs are disposed at the bottom of the U-shaped elastic hoop support legs 17, and two ends of each U-shaped elastic hoop support leg 17 are bent inwards to be buckled and connected to steps disposed on an outer wall of the shell 1.

A slot for installing a wireless charging cover 18 is formed after the left shell 11 and the right shell 12 are assembled together, and a charging coil holder for fixing a wireless charging coil is disposed on an inner side of the wireless charging coil cover 18.

A panel display screen of the control module 2 is installed on the front control panel mount 13.

A cooling fan 5 is installed on a back side of the control module 2, and a water shield 21 for guiding water from the outside to two sides is disposed right above the cooling fan 5.

A shell of the battery module 3 is formed by a left part and a right part which are assembled together, and circular mounting holes are formed in four corners of the shell of the battery module 3.

The battery module 3 is installed between the left shell 11 and the right shell 12 through connecting rods 31 penetrating through the mounting holes.

The connecting rods 31 are external hexagonal prisms, and locking screws screwed-in from the shell are disposed at two ends of each connecting rod 31.

Anti-rotation gaskets 311 are disposed at two ends of each mounting hole.

Internal hexagonal holes matching the connecting rods 31 in size are formed in the center of the anti-rotation gaskets, and annular petal-like protrusions are disposed at inner ends of the anti-rotation gaskets 311 and stretch into the mounting holes, and outer ends of the anti-rotation gaskets 311 are shaped like a circular plate and abut against the ends of the mounting holes.

Each of anti-rotation protrusions on inner walls of the mounting holes is exactly clamped between any two of the petal-like protrusions at the inner ends of the anti-rotation gaskets 311, such that anti-rotation and quick positioning and installation are realized.

A cooling fan 5 is disposed on a right side of the battery module 3, an opening matching the cooling fan 5 in size is reserved in the right shell 12, and an air outlet 111 is formed in the right shell 11 corresponding to a left side of the battery module 3.

The inverter module 4 is installed between the left shell 11 and the right shell 12 through bolts.

A cooling fan 5 is disposed at the top of the inverter module 4, and a water baffle 41 inclining backwards is erected right above the cooling fan 5 to guide water from the outside backwards.

An air outlet is formed in the bottom of the inverter module 4.

Before the waterproof covers 15 are installed, the right shell 12, the front control panel mount 13 and the rear inverter ventilator 14 are assembled together; then, the assembled part of the shell is placed horizontally; next, the control module 2, the battery module 3 and the inverter module 4 are sequentially installed from front to back; after the internal parts are installed, the left shell 11 is installed, and corresponding nuts are screwed to fix the battery module and the inverter module 4; then, the U-shaped elastic hoop support legs 17 are installed, with two ends being buckled in the left shell 11 and the right shell 12 respectively; and finally, the waterproof covers 15 are installed, such that the U-shaped elastic hoop support legs 17 are fastened.

What is claimed is:

1. A portable energy-storage power supply device, comprising
    a shell;

a control module;
    a battery module; and
    an inverter module;
    wherein the control module, the battery module and the inverter module are located in the shell and are installed from front to back;
    wherein the shell comprises a left shell, a right shell, a front control panel mount and a rear inverter ventilator;
    wherein the left shell, the right shell, the front control panel mount and the rear inverter ventilator are assembled together, a panel display screen of the control module is installed on the front control panel mount, a shell of the battery module is formed by a front part and a right part which are assembled together, circular mounting holes are formed in four corners of the shell of the battery module, the battery module is installed between the left shell and the right shell through connecting rods penetrating through the mounting holes, and the inverter module is installed between the left shell and the right shell through bolts;
    wherein a positioning groove matching an outer contour of a middle of the inverter module is disposed on an inner side of a middle of the rear inverter ventilator and is used for realizing clamping of the inverter module;
    wherein a horizontal handle is formed at a top of the shell, U-shaped elastic hoop support legs are symmetrically disposed at front and rear ends of a bottom of the shell, ribs are disposed at a bottom of the U-shaped elastic hoop support legs, and two ends of each said U-shaped elastic hoop support leg are bent inwards to be buckled and connected to steps disposed on an outer wall of the shell.

2. The portable energy-storage power supply device according to claim 1, wherein a cooling fan is installed on a back side of the control module, and a water shield for guiding water from an outside to two sides is disposed right above the cooling fan; a cooling fan is disposed at a top of the inverter module, and a water baffle inclining backwards is erected right above the cooling fan to guide the water from the outside backwards; and an air outlet is formed in a bottom of the inverter module.

3. The portable energy-storage power supply device according to claim 2, wherein the rear inverter ventilator is a grid structure, a top grid opening is used as an air supply port of the cooling fan at the top of the inverter module, and a bottom grid opening is used as an air discharge port in the bottom of the inverter module.

4. The portable energy-storage power supply device according to claim 1, wherein a cooling fan is disposed on a right side of the battery module, an opening matching the cooling fan in size is reserved in the right shell, an air outlet is formed in the left shell corresponding to a left side of the battery module, waterproof covers which are installed through buckles are disposed on an outer side of the left shell and an outer side of the right side, and strip-shaped air vents are formed in the waterproof covers.

5. The portable energy-storage power supply device according to claim 1, wherein the connecting rods are external hexagonal prisms, and locking screws screwed-in from the shell are disposed at two ends of each said connecting rod;
    wherein anti-rotation gaskets are disposed at two ends of each said mounting hole, internal hexagonal holes matching the connecting rods in size are formed in a center of the anti-rotation gaskets, annular petal-shaped protrusions are disposed at inner ends of the anti-rotation gaskets and stretch into the mounting holes, and outer ends of the anti-rotation gaskets are shaped in a circular plate and abut against ends of the mounting holes;

wherein each of anti-rotation protrusions on inner walls of the mounting holes is exactly clamped between any two of the petal-shaped protrusions at the inner ends of the anti-rotation gaskets, such that anti-rotation and positioning and installation are realized.

6. The portable energy-storage power supply device according to claim 1, wherein a slot for installing a wireless charging cover is formed after the left shell and the right shell are assembled together, and a charging coil holder for fixing a wireless charging coil is disposed on an inner side of the wireless charging coil cover.

7. The portable energy-storage power supply device according to claim 1, wherein the U-shaped elastic hoop support legs are made of rubber.

8. The portable energy-storage power supply device according to claim 3, wherein a windshield cotton strip which extends vertically downwards to the bottom of the shell is disposed at an end of the positioning groove, and a horizontal windshield cotton strip is inwardly disposed below the air outlet of the inverter module to guide an air direction of the air outlet of the inverter module.

\* \* \* \* \*